(No Model.)

A. J. ROSS.
BALE TYING MECHANISM.

Patented Feb. 2, 1897.

Witnesses
G. M. Lamasure
G. H. Walmsley

Inventor
A. J. Ross
By Alexander & Davis
Attorneys

(No Model.)  6 Sheets—Sheet 4.

A. J. ROSS.
BALE TYING MECHANISM.

No. 576,473.  Patented Feb. 2, 1897.

Witnesses
G. M. Lamasure
G. H. Walmsley

Inventor
A. J. Ross
By Alexander Davis
Attorneys

(No Model.) 6 Sheets—Sheet 5.

A. J. ROSS.
BALE TYING MECHANISM.

No. 576,473. Patented Feb. 2, 1897.

Witnesses
Inventor
A. J. Ross

(No Model.) 6 Sheets—Sheet 6.

A. J. ROSS.
BALE TYING MECHANISM.

No. 576,473. Patented Feb. 2, 1897.

Witnesses
G. M. Lamaaure
G. H. Walmsley.

Inventor,
Andrew J. Ross
By Alexander & Davis
Attorneys

THE NORRIS PETERS CO., PHOTO-LITHO., WASHINGTON, D. C.

UNITED STATES PATENT OFFICE.

ANDREW J. ROSS, OF BRECKENRIDGE, MINNESOTA, ASSIGNOR OF THREE-EIGHTHS TO J. H. FITZGERALD, OF CAMPBELL, MINNESOTA.

BALE-TYING MECHANISM.

SPECIFICATION forming part of Letters Patent No. 576,473, dated February 2, 1897.

Application filed September 10, 1896. Serial No. 605,398. (No model.)

*To all whom it may concern:*

Be it known that I, ANDREW J. ROSS, a citizen of the United States, residing at Breckenridge, in the county of Wilkins and State of Minnesota, have invented certain new and useful Improvements in Bale-Tying Devices, of which the following is a specification, reference being had therein to the accompanying drawings.

This invention relates to that class of automatic baling and tying machines wherein the material to be compressed and baled is placed in an open-ended box or baling-chamber, a compressed and tied bale forming a moving platen against which the succeeding bale is pressed. The material is automatically compressed into bales of the desired size and bound with wire, the wire being automatically placed around the bale and tied or twisted together and cut while the bale of material is in the baling-chamber, the completed bales passing out of the open end of the bale-box.

The invention has for some of its objects to improve the construction of the mechanism for placing the binding-wires around the bales, the twisting and cutting mechanism, and the means for automatically operating these parts. Other advantages and objects of the invention will hereinafter appear.

In the drawings, Fig. 3 is a bottom plan. Fig. 3ª is a detail of one of the operating-rods which will be hereinafter described.

Figure 2:
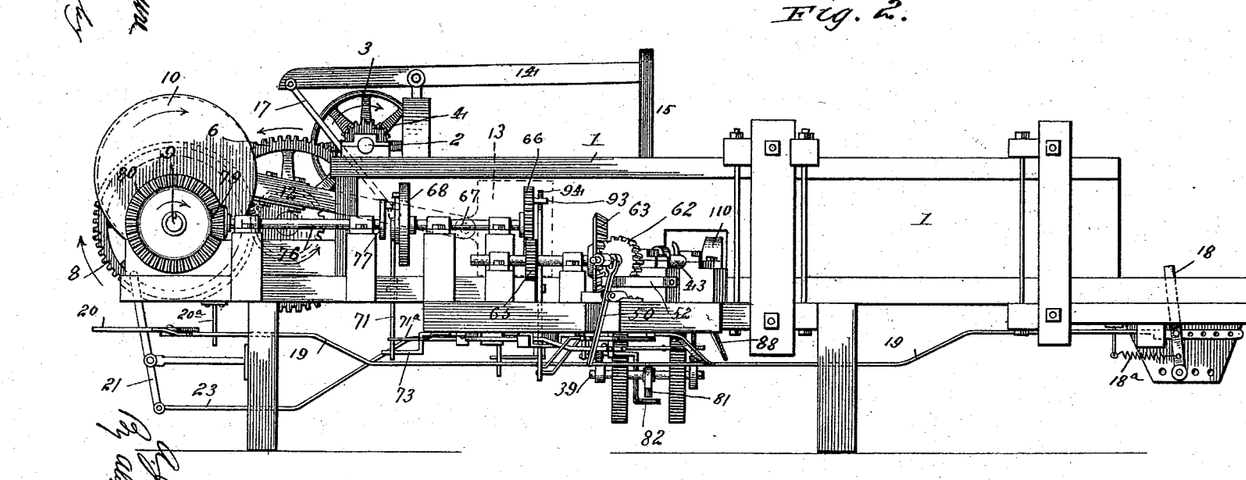
Fig. 2 is a side elevation thereof.
Figures 3, 3A:
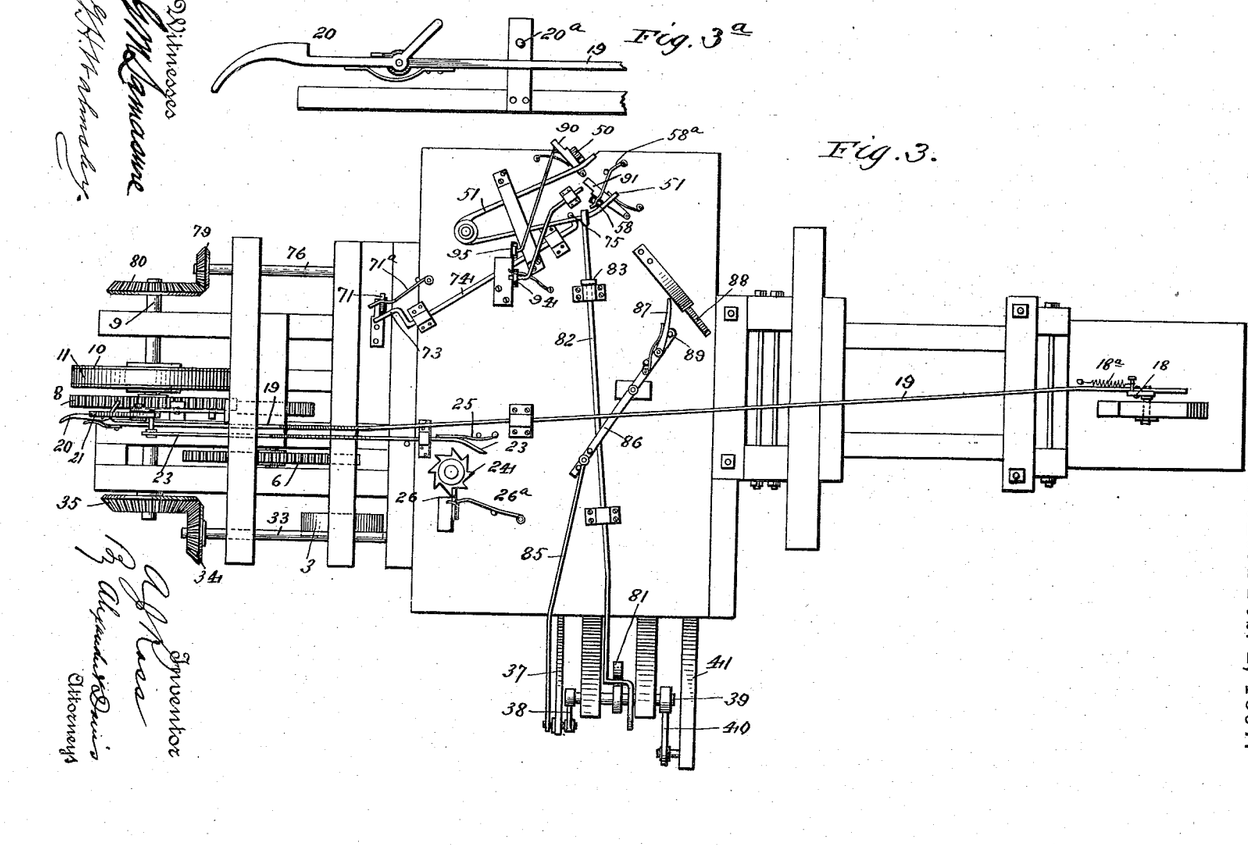
Figure 4:
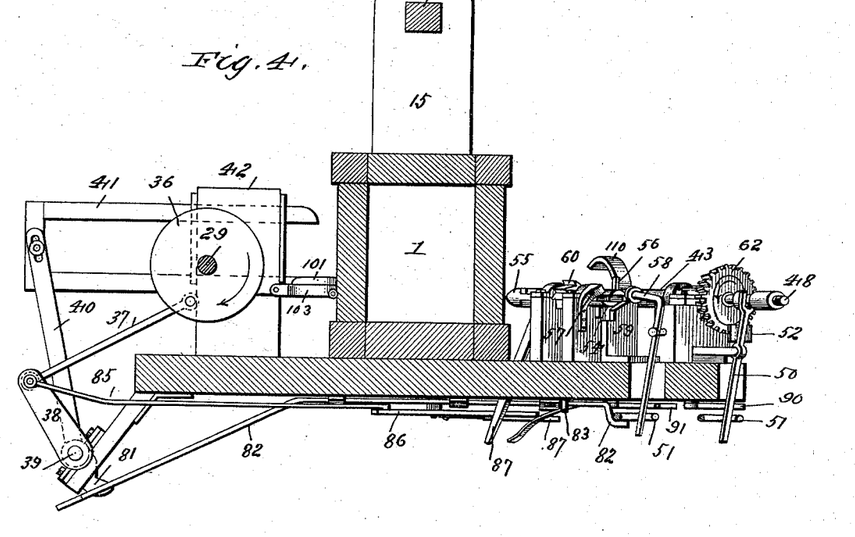
Fig. 4 is a cross-sectional view on line 4 4 of Fig. 1.

Referring to the various parts by numerals, 1 designates the bale-box, which is suitably mounted upon a main frame or base; 2, the driving-shaft, which is mounted on the rear end of the box and carries the driving-pulley 3 and a small gear 4. To the rear of shaft 2 is a short shaft 5, carrying a large gear 6, which meshes with gear 4, and on the inner end of shaft 5 is a small gear 7, which meshes with a large gear 8, secured upon a transverse shaft 9. Mounted upon this shaft 9 in line with the longitudinal center of the bale-box is a large eccentric 10, and connected to this eccentric by strap 11 is the plunger-rod 12, which is connected to the plunger 13 in the bale-box. Pivoted on the top of the bale-box is a lever 14, whose forward end is provided with a packing-head 15, which forces the material to be baled into the baling-chamber through the opening 16 in the upper side thereof. The rear end of this lever is connected by rods 17 to the plunger-rod, as shown in dotted lines in Fig. 2, in such a manner that as the plunger is drawn rearwardly the rear end of the lever 14 will be raised and the packing-head 15 forced down into the baling-chamber. By this means the charges will be automatically forced into the baling-chamber at each rearward movement of the plunger.

The operation of the plunger is continued until the bale being formed has forced the preceding bale (which remains in the forward part of the bale-box) forward a sufficient distance to throw down the lever 18, which is pivoted below the bed of the press, its upper end extending into the path of the bales as they are forced out of the bale-box.

Secured to the lever 18 below the bed of the press is a rod 19, which extends longitudinally under the press to its rear end. A spring-pressed hook 20 is secured to the rear end of this rod, said hook engaging the upper end of a pivoted lever 21. As bar 19 is drawn forward by lever 18 the hook 20 draws lever 21 into an approximately vertical position, its upper end then extending into the path of a pin 22, which projects from the side of gear 8. When lever 21 is in its vertical position, an arm of hook 20 engages pin 20<sup>a</sup> and releases the hook from the lever and permits the rod 19 to move forward. Secured to lever 21 is a rod 23, which extends forwardly under the bed of the press, its forward end being adapted to engage a large ratchet or cam wheel 24, mounted on the base of the press. As the upper end of lever 21 is drawn forward rod 23 is drawn rearward into engagement with the wheel 24, spring 25 forcing its end into engagement therewith. As gear 8 revolves in the direction indicated by the arrows pin 22 engages the upper end of lever 21 and forces it rearward, thereby forcing forward the rod 23 and revolving cam-wheel 24 one tooth. This operation is so timed that pin 22 will contact with lever 21 the instant the lever has been brought into position by the rod 19. As the cam-wheel revolves it forces outwardly the lower end of a spring-pressed pivoted lever 26, whose upper end is thereby moved inwardly, releasing and throwing into operation the needle-operating clutch. A spring 26$^a$ normally forces the lower end of said lever inwardly.

The upper end of lever 26 in its normal position engages the outer end of a cam-plate 27, which is pivotally mounted upon a disk 28, said disk being rigidly secured to the rear end of a short longitudinal shaft 29. A spring 30 draws the outer end of cam-plate 27 inwardly and throws outwardly the inner end of said plate into the path of a pin 31, which projects from an arm 32, mounted on the forward end of a shaft 33, which is axially in line with shaft 29. A gear 34 is secured to the rear end of shaft 33 and meshes with a gear 35, secured upon the shaft 9. When lever 26 is in engagement with cam-plate 27, the inner end of said plate is out of the path of the pin 31, but when the plate 27 is released from the lever its inner end is thrown out, as described, and is engaged by pin 31, and shafts 33 and 29 then revolve together. A portion of the outer end of the cam-plate 27 is cut away to permit the pin 31 to pass when it does not contact with the inner end of the plate.

Figures 5, 6, 7:
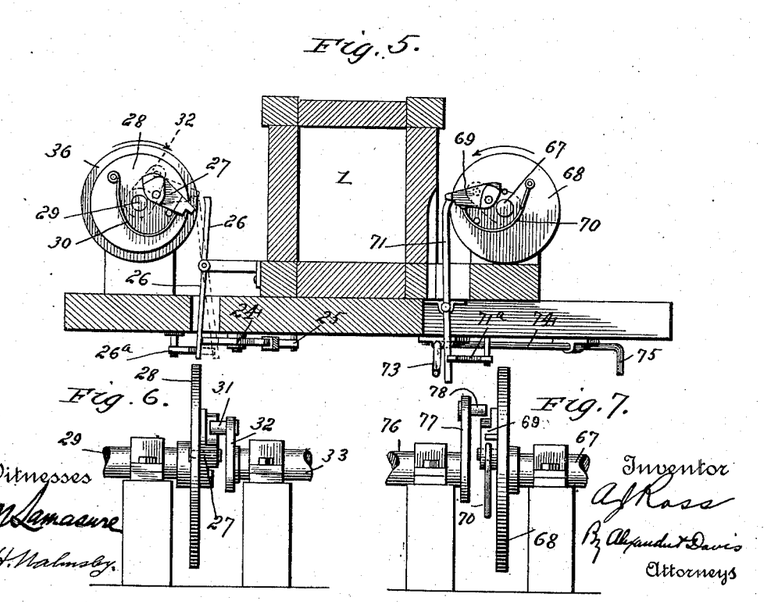
Fig. 5 is a similar view taken on line 5 5 of Fig. 1.
Fig. 6 is a detail of the clutch connected to the needle-driving mechanism.
Fig. 7 is a detail of the clutch connected to the gripping and twisting mechanisms.
Figures 8, 9:
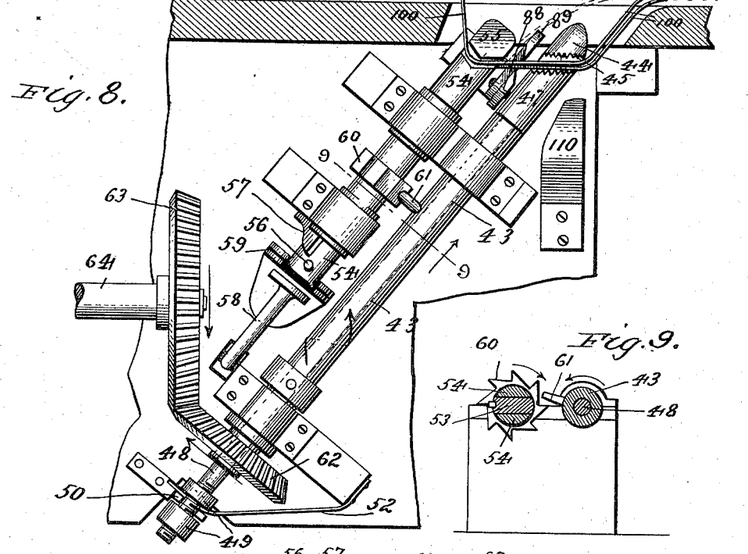
Fig. 8 is a detail plan view of the gripping and twisting mechanisms.
Fig. 9 is a detail cross-section on line 9 9 of Fig. 8.
Figure 10:
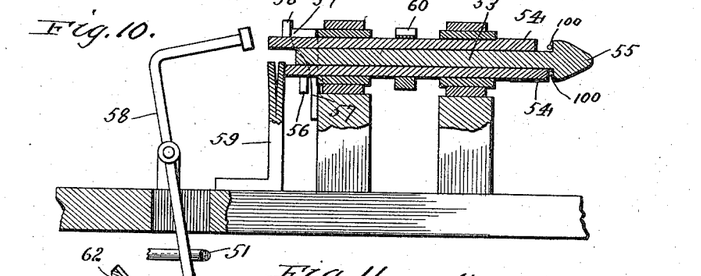
Fig. 10 is a vertical longitudinal sectional view of the grip.
Figure 11:
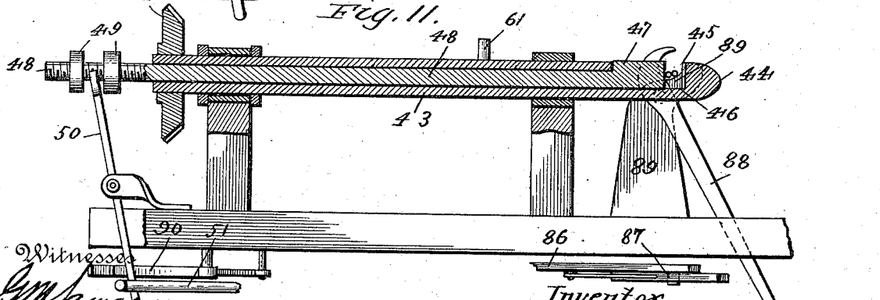
Fig. 11 is a similar view of the twisting mechanism.

Secured upon the forward end of the shaft 29 is a disk 36, to which is eccentrically pivoted a rod 37, said rod extending outwardly, its outer end being pivoted to a crank 38 of a shaft 39, mounted in bearings below the bed of the press. To the forward end of the shaft 39 is secured a crank-arm 40, which extends upwardly and is pivotally connected to the outer end of a needle-carrying frame 41, which is supported and guided in a suitable frame 42. As shaft 29 makes one revolution shaft 39 is rocked through the crank 38, and the needle-frame carrying the needles is forced through the bale-chamber, the needles depositing the wires in the grips and twisting mechanism, as will be hereinafter described, and then returning to its normal position. When the needle-frame has returned to its normal position, the outer end of cam-plate 27 contacts with the upper end of lever 26, and the inner end of said plate is thrown inwardly out of the path of pin 31, and shaft 29 ceases to revolve and remains stationary until lever 26 again releases the clutch, as shown in dotted lines on the left-hand side of Fig. 5.

The tying-wire is carried across the baling-chamber by the needle and is deposited in the gripping mechanism, and as the needle returns devices are operated which cause these mechanisms to clamp the wires, and then the twisting mechanism is operated.

The twister consists of a horizontal tubular shaft 43, mounted in suitable bearings and set at an angle of about forty-five degrees to the side of the press, its forward end extending inwardly and terminating close to the side of the press in a solid tapered head 44, formed with the gripping-surface 45 parallel with the side of the press. From this gripping-surface outwardly for a short distance the shaft is cut away to form the flat surface 46, upon which slides the movable gripping-jaw 47. This jaw is secured on the inner end of a rod 48, which passes longitudinally through the hollow shaft 43, its outer end extending beyond the outer end of the shaft and being provided with the adjustable collars 49. The upper end of a spring-pressed pivoted lever 50 engages the rod 48 between the collars 49 and operates to close and open the gripping-jaws. The lower end of this lever is engaged and forced outwardly by the outer arm of a ⊂-shaped lever 51, pivoted to the under side of the press-bed. A spring 52 normally forces the upper end of lever 50 outwardly and maintains the gripping-jaw 47 open. Parallel with the twister-shaft 43 and in close proximity thereto is the gripping device, which consists of a central bar or portion 53 and two outer slidable bars 54 54, mounted one upon the top and the other upon the bottom of the bar 53. These three parts form a cylindrical bar or shaft, which is mounted in suitable bearings and is in the same horizontal plane with the twister-shaft 43. The inner ends of the bars 54 are formed into gripping-jaws and are adapted to fit against similar jaws formed on the enlarged tapered head 55, formed on the inner end of bar 53. These gripping-jaws are directly opposite the gripping-jaws of the twister.

At their rear ends the bars 54 are each provided with a radial pin 56, which is adapted to engage cam 57 and draw the bars rearwardly and release the gripping-jaws when the gripping device is revolved, as will be hereinafter described. To force the jaws to a closed position, a pivoted lever 58 is provided, whose upper end is adapted to contact with the rear end of each of the bars 54 and force it inward. The lower end of this lever extends below the press-bed and is forced inwardly by a spring 58$^a$, but is adapted to be forced outwardly by the inner arm of the C-shaped lever 51. To hold the gripping-jaws in their closed position, a spring-plate 59 is mounted adjacent the ends of the bars 54, the upper end of said plate being so formed that it will bear on the end of one of the bars and hold the jaws closed during slightly more than one-half of a revolution of the gripping device, said plate being cut away to release the bar during the last part of the revolution to permit it to be drawn rearwardly by its pin 56 engaging the cam 57. After the lever 58 has forced inward the upper bar 54 it holds it in that position until the gripping device has revolved sufficiently to permit the spring-plate 59 to engage it. Mounted upon the bar 53 and encircling the bars 54 is a wheel 60, having eight teeth, and adjacent said wheel the twister-shaft is provided with a radial pin 61, which engages the wheel 60 as the twister revolves and turns the gripping device one tooth for every revolution made by the twisting-shaft.

Mounted upon the rear end of the twister-shaft 43 is a small beveled gear 62, which meshes with a similar gear 63, double the size of gear 62 and mounted on the forward end of a short horizontal shaft 64. A small gear 65, mounted on this shaft, meshes with a gear 66, double the size of gear 65 and mounted upon the forward end of another short longitudinal shaft 67. The rear end of this shaft 67 carries a disk 68, the rear face of which is provided with a cam-plate 69, similar in construction to cam-plate 27, and the outer end of said plate is connected to a spring 70, which operates in the same manner as spring 30, connected to plate 27. The outer end of cam-plate 69 is adapted to be engaged by the upper end of a pivoted lever 71, whose lower end extends below the bed of the press and is pressed inwardly by a spring 71$^a$, but is adapted to be engaged and forced outwardly by the crank-arm 73, formed on the end of a rock-shaft 74, the other end of said rock-shaft being formed with a crank-arm 75, which extends into the path of the inner arm of C-shaped lever 51. Mounted axially in line with the shaft 67 is a longitudinal shaft 76, upon the forward end of which is secured a crank-arm 77, which carries at its outer end a pin 78. When the lower end of lever 71 is thrown outwardly by crank-arm 73, as will be hereinafter described, the plate 69 is released and pin 78 of crank 77 engages the cam portion of said plate and causes shaft 67 to revolve with shaft 76 until the pin is released from said cam by the outer end of the plate 67 contacting with the upper end of lever 71 in the same manner as plate 27 and lever 26, already described. Upon the rear end of shaft 76 is a small gear 79, which meshes with a large gear 80, secured on shaft 9.

When the needle is forced through the baling-chamber, it carries the binding-wire, as will be more fully hereinafter described, and deposits it in the grip and twister. An arm 81, carried by the rock-shaft 39, engages the bent end of a bar 82 and draws it outwardly until stop 83 on said bar contacts with one of the supports of said bar. The rounded end of said arm 81 will then slip over the bent end of the bar 82, the rod 82 being sufficiently flexible to permit this. The other end of said rod is bent downwardly and is adapted to engage the inner end of the C-shaped lever 51. As the needle returns to its normal position the arm 81 forces inwardly the rod 82, and thereby swings lever 51 outwardly upon its pivot. As this lever swings outwardly it forces the lower ends of levers 50 and 58 and applies the upper grip 54 and closes the jaws of the twister upon the wires.

Secured to the crank-arm 38 is a rod 85, whose inner end is connected to one end of a pivoted bar 86. This bar is provided at its other end with a spring-pressed finger 87, which turns on its pivot and passes the lower end of a cutting-lever 88 when the needle is driven through the baling-chamber. The upper end of this lever 88 extends up between the twister and grip at their inner ends and is pivoted to and works on a rigid cutting-jaw 89. When the wire is deposited in the grip and twister, it extends between the jaws of the cutting device. As the needle is returning to its normal position the rod 85 is drawn outwardly and finger 87 contacts with the lever 88 and closes the jaws of the cutting device (the finger being prevented from turning on its pivot during this movement by a pin 92) and cuts the wires. When the levers 50 and 58 are thrown out by the lever 51, they engage spring-catches 90 and 91 and hold the jaws of the grip and twister in their closed positions. Simultaneously with the locking of the levers 50 and 58 and the cutting of the wires the rock-shaft 74 is rocked sufficiently to release lever 71 from plate 69, and pin 78 immediately engages plate 69, and shaft 67 then revolves with shaft 76. The train of gears connecting shaft 67 with twister-shaft 43 are so proportioned that one revolution of the shaft 67 will cause the twister-shaft to revolve four times, and thereby give the binding-wire four twists to secure it around the bale.

Figure 1:
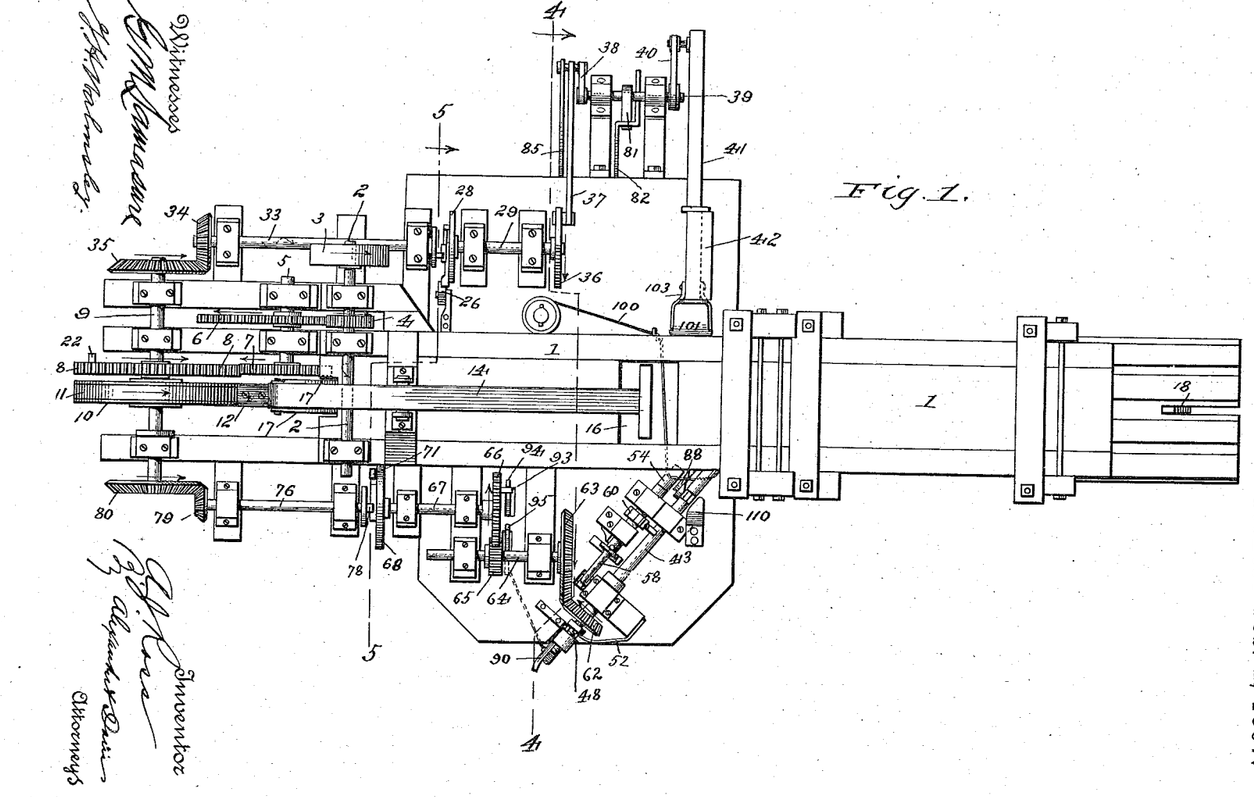
Figure 1 is a plan view of the press complete.

When the twister has made four revolutions, the gripping device has made a one-half revolution by reason of the pin 61 contacting four times with the wheel 60, and closed jaw 54 will be turned down and held in its position by the plate 59, said closed jaw holding the end of the binding-wire 100, which extends across the baling-chamber to the reel, as shown in Fig. 1. As the gripping device revolves the lower closed jaw is opened by its pin 56 contacting with cam 57, as described. When the gripping device has revolved sufficiently to secure the closed jaw 54 against the plate 59, a pin 93, projecting forward from the gear 66, contacts with a lever 94, whose lower end contacts with catch 91, and releases lever 58 from gripping device 54, and when the twisting device has made its four revolutions pin 93 contacts with the upper end of a lever 95, which is connected at its lower end by a rod to the catch 90 and releases the gripping-jaw of the twisting device. When shafts 76 and 67 have made one revolution, the outer end of plate 69 contacts with the upper end of lever 71, and the clutch mechanism is thereby disconnected, as will be readily understood.

Figure 12:
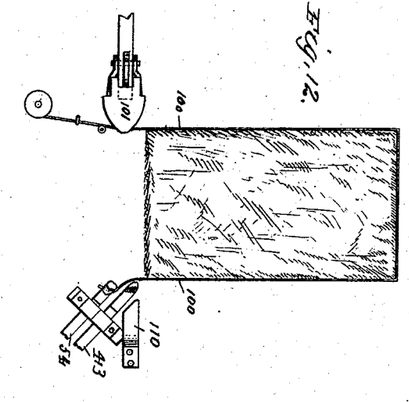
Figs. 12 and 13 are detail views showing the operation of the needle and gripping mechanism.
Figure 13:
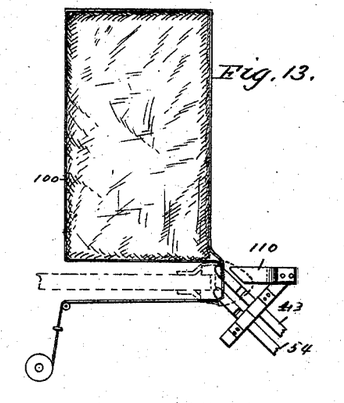
Figure 14:
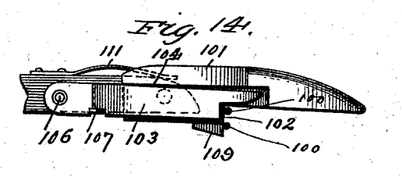
Fig. 14 is a side elevation of the needle-head.
Figure 15:
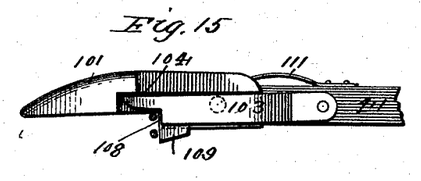
Fig. 15 is a similar view of the opposite side thereof.
Figure 16:
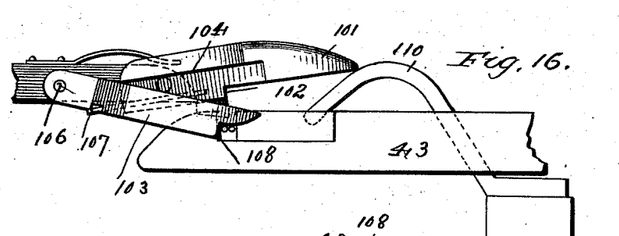
Fig. 16 is a detail of the needle, showing the operation of delivering the wires to the gripping and twisting mechanisms.
Figure 17:
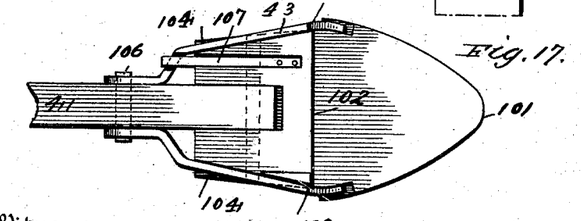
Fig. 17 is a bottom view of the needle-head.

The press is now in position to start a new bale, and material is placed in the baling-chamber to the rear of the wire 100 and then forced by the plunger into the bale-box, carrying the wire with it. As the wire is carried back into the bale-chamber it extends in front of the needle slightly below its upper surface and also in front of the twister slightly above the center thereof, as shown in Fig. 12. When the bale is completed, the needle is carried across the baling-chamber, carrying the wire with it and depositing it in the gripping and twisting devices. Each needle consists of a head 101, which is pivoted near its outer end to the inner end of one arm of the needle-frame 41, said head being pointed at its inner end and its upper surface being curved down to the point. A vertical shoulder 102 is formed on the under side of the head and extends transversely thereof. From about its middle the sides of the head taper slightly toward its outer end, said sides being each recessed for the reception of a pivoted arm 103, the shoulders 104, formed by cutting out the sides of the head, bearing on the upper edge of the arms 103. These arms are rigidly pivoted together by the pivot-rod 106, and both move together. To hold these arms within the recesses, a flat spring 107 is secured to the head 101, its free end bearing on the under side of one of the arms and forcing them upward into the recesses. The forward ends of these arms are cut out adjacent the shoulders 102 to form corresponding shoulders 108, the points of the arms extending beyond the shoulders, as shown. When the needle passes across the baling-chamber, the shoulder 102 engages the wire 100 and carries it with it. On that side of the head 101 toward the forward end of the press, at the end of the shoulder 102, is formed a depending lug 109, which engages that part of the binding-wire 100 which extends from the under side of the gripping device forward in front of the tapered head of the twisting-shaft and pushes it up over said head into the gripping-jaws. When the needle has advanced so far that the two ends of the wire are over the jaws of the gripping and twisting devices, the point of the needle contacts with a cam 110 and rises, causing its outer end to force down the arms 103, the inner end of these arms contacting with the wires and forcing them into the open jaws of the gripping and twisting devices, as shown in Fig. 16. A spring 111 normally holds the forward end of head 101 down.

As the completed bales drop off the press-bed they relieve lever 18, and spring 18ª draws it to its vertical position and forces rod 19 rearwardly, and spring-hook 20 is permitted to pass lever 21 and take its position for the next operation. By means of the holes shown the relative positions of lever 18 and rod 19 may be properly adjusted.

In the drawings only one set of twisting mechanism and one needle is shown; but, as will be readily understood, one set of these devices will be used for each wire placed around the bale.

Having thus fully described my invention, what I claim, and desire to secure by Letters Patent, is—

1. In a baling-press, the combination of a baling-chamber, a plunger, a twisting mechanism and means for operating it, an independent gripping device adjacent the twisting mechanism, means for operating it, means for carrying the wire across the bale-chamber and depositing it in the twister and in the grip, a wire-cutting mechanism arranged between the twister and the grip, means for operating said mechanism to cut the wire before the twisting mechanism revolves, and means for partially revolving the gripping device during the rotation of the twisting mechanism, substantially as described.

2. In a baling-press the combination of a baling-chamber, a plunger, a transverse shaft, means carried by said shaft for reciprocating said plunger, means for revolving said shaft, a movable device in the path of the completed bales, a rod 19 connected to said movable device, a lever 21 adapted to be engaged by the rod 19, a part carried by the transverse shaft and adapted to engage lever 21 as said shaft revolves, a rod 23 connected to lever 21, a clutch mechanism, a needle mechanism, said clutch mechanism connecting the needle mechanism, and devices operated by rod 23 to operate said clutch mechanism, substantially as described.

3. In a baling-press the combination of a driving mechanism, a plunger, an operating-shaft therefor, a lever 18, means for adjusting the pivot thereof longitudinally, a rod 19 adjustably connected to said lever, a spring-hook 20 carried by said rod, a stop 20ª adapted to be engaged by the rear end of hook 20, a lever 21 adapted to be engaged by hook 20, a part carried by the plunger-operating shaft and adapted to engage lever 21, a needle mechanism, and means operated by lever 21 to connect said needle mechanism with the driving mechanism, substantially as described.

4. In a baling-press the combination of a baling-chamber, a plunger, means for reciprocating said plunger consisting of an eccentric carried by a transverse shaft, a gear upon said shaft, means for revolving said gear, a lever 18, rod 19 connected thereto, lever 21 adapted to be engaged by rod 19, a pin 22 carried by gear on the shaft of the eccentric and adapted to engage lever 21, a rod 23 connected to lever 21, a cam-wheel adapted to be engaged and revolved by the rod 23, a lever 26 operated by the cam-wheel, a clutch mechanism operated by lever 26 and a needle mechanism, said clutch mechanism connecting the needle mechanism with the driving mechanism, substantially as described.

5. In a baling-press the combination of an open-ended baling-chamber, a plunger, a device located in the path of the completed bales and adapted to be engaged by them to operate a clutch connecting the needle mechanism to the driving mechanism, said clutch consisting of a disk 28 a shaft 29 connected to the needle mechanism, a plate 27 pivoted on said disk, a spring 30, lever 26 adapted to engage plate 27 as described, a shaft 33 connected to the driving mechanism, arm 32 on said shaft, pin 31 carried by said arm, and means for releasing lever 26 from plate 27, substantially as described.

6. In a baling-press the combination of a baling-chamber, a plunger, a needle-operating mechanism, consisting of a rock-shaft, an arm 38 on said shaft, a rod connecting said arm to disk 36, shaft 29 carrying said disk, means for automatically connecting and disconnecting said shaft with the driving mechanism, an arm 40 secured to the rock-shaft, a reciprocating needle-frame connected to said arm, a needle or needles carried by said frame, an arm 81 also connected to the rock-shaft, a rod 82 engaged and operated by said arm 81, a twisting mechanism, means for delivering the wire from the needle to the twisting mechanism, and means operated by rod 82 for setting in motion the twisting mechanism on the return stroke of the needle-frame, substantially as described.

7. In a baling-press the combination of a baling-chamber, a plunger, a twisting device and means for revolving it, means for carrying the wire across the baling-chamber and delivering it to the twisting device, said twisting device consisting of a shaft formed with a rigid jaw, and a sliding jaw carried by said shaft, means for moving said sliding jaw and for holding it in its closed position, means operated by the needle mechanism for connecting and disconnecting the twister-revolving mechanism with the driving mechanism, and means operated by the twister-revolving mechanism for releasing the sliding jaw of the twister device, substantially as described.

8. In a baling-press the combination of a baling-chamber, a plunger, a twisting device, means for revolving said device, a gripping device, means for carrying the wire across the baling-chamber and delivering it to said devices, said gripping device consisting of a revoluble bar formed with rigid jaws, sliding jaws carried by said bar, means for alternately closing said jaws against the rigid jaws, means for holding said jaws closed during a partial revolution of the gripping device, and means for opening said jaws during the remainder of the revolution of the device, means for revolving said gripping device, and a cutting device operating between the grip and the twisting device, substantially as described.

9. In a baling-press the combination of a baling-chamber, a plunger, a twisting device and means for operating it, a gripping device, means for carrying the binding-wire across the baling-chamber and delivering it to the said devices, the gripping device consisting of the bar 53 formed with the rigid jaws, sliding jaws 54 carried by bar 53, means for alternately closing said sliding jaws, spring-plate 59 for holding said jaws closed during a portion of the revolution of the gripping device, pins 56 carried by the sliding jaws, a cam 57 adapted to be engaged by the pins 56 to open the jaws, and means operated by the twisting device to revolve the gripping device, substantially as described.

10. In a baling-press the combination of a baling-chamber, a plunger, a twisting device, a mechanism for revolving said device, a gripping device, means for carrying the wire across the baling-chamber and delivering it to the gripping and twisting devices, the gripping device comprising the bar 53, jaws 54, 54 sliding one on the top and the other on the bottom of bar 53, the upper jaw normally remaining open, lever 58 operated by the needle mechanism for closing the upper jaw of the gripping device, means for holding said lever to secure the jaw in its closed position, and means operated by the twister-revolving mechanism for releasing said lever, means for holding said jaw in its closed position during a portion of one revolution, and means operated by the twister-shaft to give the gripping device an intermittent revolving motion, substantially as described.

11. A needle for a baling-press comprising a pivoted head pointed at its forward end, and formed with a wire-engaging shoulder, in combination with a cam adapted to engage the point of the needle-head and tip the head, and means operated by the head to force the wire off the wire-engaging shoulder when the head is tipped, substantially as described.

12. A needle for a baling-press comprising a needle-bar, a pivoted head 101 carried by said bar and formed with shoulders 104, arms 103 pivoted on said bar and fitting under shoulder 104, means carried by the pivoted head for holding said arms yieldingly in position, a wire-engaging shoulder formed on the under side of the pivoted head, in combination with a cam adapted to engage the point of the pivoted head and raise it, substantially as described.

13. A needle for a baling-press comprising a needle-arm, a head 101 pivoted thereto and formed with shoulders 104, arms 103 pivoted to said arm and extending forward under shoulder 104, spring 107 carried by the pivoted head and engaging arms 103, a wire-engaging shoulder formed on the under side of head 101, the forward ends of arms 103 projecting forward of said shoulder, a lug 109 formed on the head 101 adjacent the shoulder 102, in combination with a cam adapted to engage head 101 and raise its forward end, substantially as described.

14. In a baling-press, the combination of a baling-chamber, a plunger, a twisting mechanism, means for operating the twisting mechanism to hold the wire, an independent gripping device adjacent the twisting mechanism, means for operating it to grip the wire, means for carrying the wire across the baling-chamber and depositing it in the twister and grip, a wire-cutting mechanism arranged between the twister and grip, means for operating said mechanism to cut the wire before the twisting mechanism revolves, and means for revolving the twisting mechanism, substantially as described.

In testimony whereof I affix my signature in presence of two witnesses.

ANDREW J. ROSS.

Witnesses:
 SIDNEY E. DE LONG,
 W. H. DE LONG.